(12) United States Patent
Kelly

(10) Patent No.: US 6,827,292 B2
(45) Date of Patent: Dec. 7, 2004

(54) WATERING SYSTEM AND FERTILIZER DISPENSER

(76) Inventor: Michael Kelly, 2 Juniper La., Saugerties, NY (US) 12477

( * ) Notice: Subject to any disclaimer, the term of this patent is extended or adjusted under 35 U.S.C. 154(b) by 161 days.

(21) Appl. No.: 10/042,677

(22) Filed: Jan. 11, 2002

(65) Prior Publication Data

US 2003/0132312 A1 Jul. 17, 2003

(51) Int. Cl.[7] ............................................. A62C 5/02
(52) U.S. Cl. ...................... 239/310; 239/317; 239/500; 137/268
(58) Field of Search ................................ 239/310, 317, 239/500, 502, 518, 521, 522; 137/268; 422/272, 274, 277, 264

(56) References Cited

U.S. PATENT DOCUMENTS

| | | |
|---|---|---|
| 3,091,401 A | 5/1963 | Hruby, Jr. |
| 3,185,397 A | 5/1965 | Nelson |
| 3,669,357 A | 6/1972 | Overby |
| 3,992,813 A | 11/1976 | Freshel |
| 4,176,791 A | 12/1979 | Cattaneo et al. |
| 4,210,624 A * | 7/1980 | Price ........................ 422/264 |
| 4,347,224 A * | 8/1982 | Beckert et al. ............ 422/277 |
| 4,729,399 A * | 3/1988 | Wetzel et al. ............. 137/268 |
| 4,778,111 A | 10/1988 | Leap |
| 5,121,882 A | 6/1992 | Skidmore |
| 5,823,430 A * | 10/1998 | Clark et al. ................ 239/10 |

OTHER PUBLICATIONS

Catalog—Soarer Hose.

* cited by examiner

*Primary Examiner*—Dinh Q. Nguyen

(57) ABSTRACT

A fertilizer dispenser with an inlet compartment and an outlet compartment with an inlet into the top of the inlet compartment. The inlet is connected to an inlet sub-line directed into the inlet compartment and an outlet sub-line directed into the outlet compartment. An outlet is located in the bottom of the outlet compartment. The inlet compartment and the outlet compartment are separated by a baffle which permits flow over the baffle from the inlet compartment to the outlet compartment. The fertilizer dispenser is used with a System for watering with a supply hoses connected in series with seep hoses. The seep hoses are located about the vegetation to be watered while the supply hoses are connected in series to the seep hoses.

8 Claims, 3 Drawing Sheets

WATERING SYSTEM AND FERTILIZER DISPENSER

BACKGROUND OF THE INVENTION

1. Field of the Invention

This invention relates to a fertilizer dispenser and a system which uses the fertilizer dispenser, for watering a garden and, in particular, to a two chambered fertilizer dispenser mixes the fertilizer with the water and which can be used with a system, which can be provided in a kit, which directs seepage watering to shrubs and trees while preventing watering of areas of the garden not requiring water and which system also simultaneously permits controlled fertilization of the shrubs and trees being watered.

2. Prior Art and Objects

One of the best ways to water plants, trees and shrubs is by slow soaking the ground around the plant, tree or shrub. Hoses which permit such slow soaking by seepage through the pores of the hose, rather than through orifices, are known. However, even running a soak hose through a garden still wastes water when the desire is to water specific plants, shrubs and trees and not the spaces between the plants, shrubs and trees.

Various equipment has previously been provided for watering purposes and for fertilization purposes. The Hruby, Jr. patent, U.S. Pat. No. 3,091,401, shows a sprinkler system for a collection of plants in a garden or area. Water is sprayed onto each plant but no soak hose is shown. Spaced nozzles mounted on a solid conduit provide a spray onto specific plants. The device must be custom made for each garden to assure the presence of a nozzle at the location of the shrub or tree to be watered and thus the device lacks flexibility.

The Nelson patent, U.S. Pat. No. 3,185,397, is an individual spraying device. Two versions are shown, one of which opens and closes like a clamp while the other is a fixed unit. This device is a spray and not a soak device and is intended expressly to spray the underside of the leaves of the plants.

The Overbey patent, U.S. Pat. No. 3,669,357 teaches a fertilizer injection system for an irrigation system but not a garden soaking system. However, Overbey provides for a pump downstream of the fertilizer unit thus providing suction to the fertilizer unit which is not part of this invention.

The Cattaneo et. al. patent, U.S. Pat. No. 4,176,791 is directed to a irrigation system that compensates for pressure drop in an extended watering line. It provides sporadic spraying by filling a reservoir and then releasing the retained water. These features are also neither taught nor claimed in this invention.

The Leap patent, U.S. Pat. No. 4,778,111 shows two short lengths of watering hose extending from a valve to wrap around a tree. The two short lengths of watering hose have apertures to permit water flow. A supply hose would be connected to the valve. This invention uses a continuous watering hose which is connected in series and not in parallel.

These patents do not disclose multiple soaker units connected in series with a device for supplying fertilizer to the plants, shrubs and trees being watered. In particular, a system that can be produced in an inexpensive kit form with multiple lengths of soaker hose and a fertilizer dispenser that mixes the fertilizer with the water for use with the watering system.

Accordingly, it is an object of this invention to provide a system for simultaneously watering a series of plants, shrubs and trees.

It is still another object of this invention to provide a system for simultaneously watering a series of plants, shrubs and trees that is readily capable of being sold in a kit form.

It is still another object of this invention to provide a system for simultaneously watering a series of plants, shrubs and trees that includes a fertilizer dispensing unit.

It is still another object of this invention to provide a system for simultaneously watering and fertilizing a series of plants, shrubs and trees that is economical and dependable.

It is still another object of this invention to provide a fertilizer dispenser for providing fertilization while watering.

It is still a further object of this invention to provide a fertilizer dispenser that is dependable and economical.

These and other objects will be apparent to those skilled in the art based upon the description of the preferred embodiment.

SUMMARY OF THE INVENTION

A fertilizer dispenser is provided to be used in series between a water source and soak hoses. The flow into the fertilizer dispenser enters the fertilizer dispenser towards the top of a fertilizer vessel in which fertilizer is placed and flows out of the fertilizer vessel at the base of the fertilizer vessel mixed with the fertilizer. Means are provided to prevent the back flow of fertilizer into the water supply and to prevent flow back into the fertilizer vessel. The fertilizer vessel is separated by a baffle into two compartments, namely an inlet compartment where the fertilizer is placed, and an outlet compartment which continues the mixing of the water and the fertilizer before discharging the mixture. The flow of water into the fertilizer vessel is divided with one part of the flow being directed into the inlet compartment and the balance of the flow is directed into the outlet compartment. Comparatively short but variable lengths of soak hose are also provided to be wrapped about a plant, shrubs and trees. Supply hoses are connected in series to the soak hoses.

DETAILED DESCRIPTION OF THE NUMERALS

| NUMERAL | DESCRIPTION |
| --- | --- |
| 11 | Boundary |
| 13 | Tree |
| 15 | Shrubs |
| 17 | Plants |
| 19 | Vegetation |
| 21 | Water Source |
| 23 | Fertilizer Dispenser |

-continued

| NUMERAL | DESCRIPTION |
| --- | --- |
| 24 | Hoses or Lines |
| 25 | Supply Hoses or Lines |
| 27 | Soak Hose or Line |
| 29 | End Cap |
| 31 | Fertilizer Vessel |
| 33 | Top of Fertilizer Vessel |
| 35 | Opening |
| 37 | Cover |
| 39 | Bottom |
| 41 | Wall |
| 43 | Inlet |
| 44 | Inlet Check Valve |
| 45 | Female Connector |
| 47 | Inlet Sub-Supply Line |
| 48 | Outlet Sub-Supply Line |
| 49 | Baffle |
| 51 | Inlet Compartment |
| 53 | Outlet Compartment |
| 57 | Spoilers |
| 59 | Outlet |
| 61 | Outlet Check Valve |
| 62 | Male Connector |
| 63 | First Supply Section |
| 65 | Second Supply Section |
| 67 | First Soak Section |
| 71 | Third Supply Section |
| 73 | Second Soak Section |
| 75 | Fourth Supply Section |
| 77 | Third Soak Section |
| 79 | Fifth Supply Section |
| 80 | Fourth Soak Section |
| 81 | Sixth Supply Section |
| 83 | Seventh Supply Section |
| 85 | Eighth Supply Section |
| 87 | Fifth Supply Section |
| 89 | Sixth Soak Section |
| 91 | Seventh Soak Section |
| 93 | Ninth Supply Section |
| 95 | Eighth Soak Section |

DETAILED DESCRIPTION OF THE PREFERRED EMBODIMENT

Figure 1:
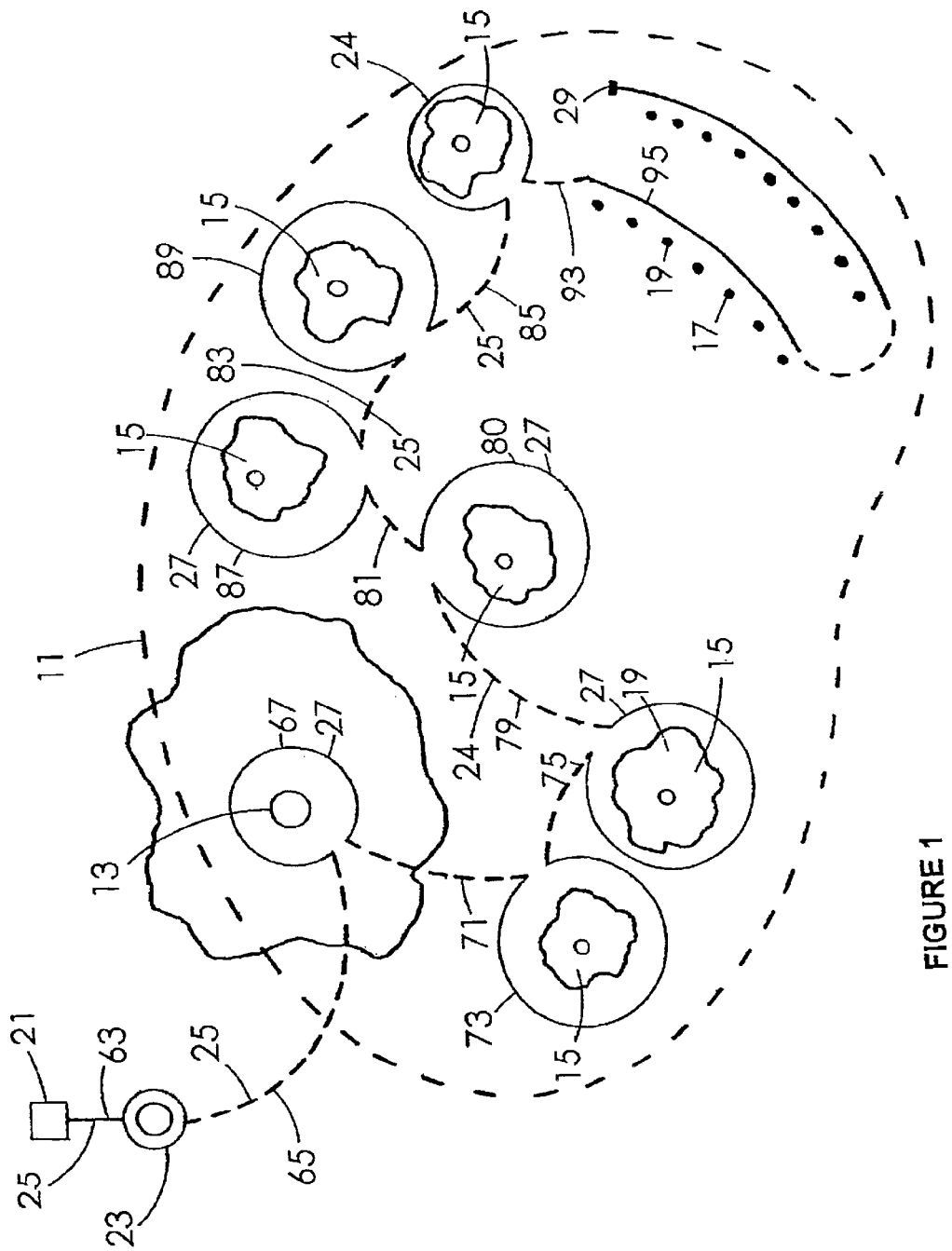
FIG. 1 is a plan view of a garden showing a tree, shrubs and plants with a series of soaker hoses connected in series to one another with a soaker hose wrapped about the tree, shrubs and plants.

Referring now to FIG. 1, a layout of a garden is shown. The garden is surrounded by a boundary 11. Located within the boundary 11 are a tree 13, a series of shrubs 15 and two rows of plants 17. Trees 13, shrubs 15 and plants 17, as well as other garden matter are all grouped together under the term "vegetation" designated by the numeral 19. A water source 21, is shown which can be any available source of water such as an outdoor faucet connected to a domestic water supply or a pump which extracts water from a lake or pond. Immediately beyond the water source 21 a fertilizer dispenser 23 is shown. The fertilizer dispenser 23 is shown in detail in FIG. 2 and FIG. 3 and will be subsequently described in greater detail. Throughout the garden, two types of hoses or lines 24 can be found. Supply hoses or lines 25 are located between the vegetation 19 where no watering is desired. Each piece of vegetation 19 is surrounded by a soak hose or line 27 which seeps water into the roots of the vegetation 19. Each of the soak hoses or lines 27 are connected in series with one another by the supply hoses or lines 25. The soak hoses 27 are preferably seepage hoses which essentially permit only a limited amount of water to soak through the pores of the soak hose 27. A soak hose 27 with small orifices placed at specific intervals could also be used but seepage hoses are most advantages as the pressure of the water supply is better maintained and the watering process of the vegetation 19 is slower and more effective. The supply hose or line 25 is shown in FIG. 1 as first extending from the water source 21 to the fertilizer unit 23 and then proceeding to a soak hose 27 about a tree 17. The soak hose 27 in turn is connected to the supply hose 25 which continues on in series to three large shrubs 15. The three large shrubs 15 are each surrounded by a soak hose 27 and those soak hoses 27 are all connected in series to one another by additional sections of supply hose 25. The supply hose 25 then proceeds in series to three smaller shrubs 15, each of which is surrounded by a soak hose 27. The supply hose 25 then proceeds in series to two rows of plants 17 with soak hose 27 along each of the two rows of plants 17. At the end of the soak hose 27 along the plants 17 an end cap 29 is installed to seal the end point of the soak hose 17.

In kit form, a number of long lengths of soak hose 27 can be provided along with preferably a greater number of shorter lengths of soak hose 27. The fertilizer unit 23 is also provided as is an end cap 29. The supply hose 25 is readily obtainable in numerous places and it is most advantageous to purchase the supply hoses 25 separately.

Figure 2:
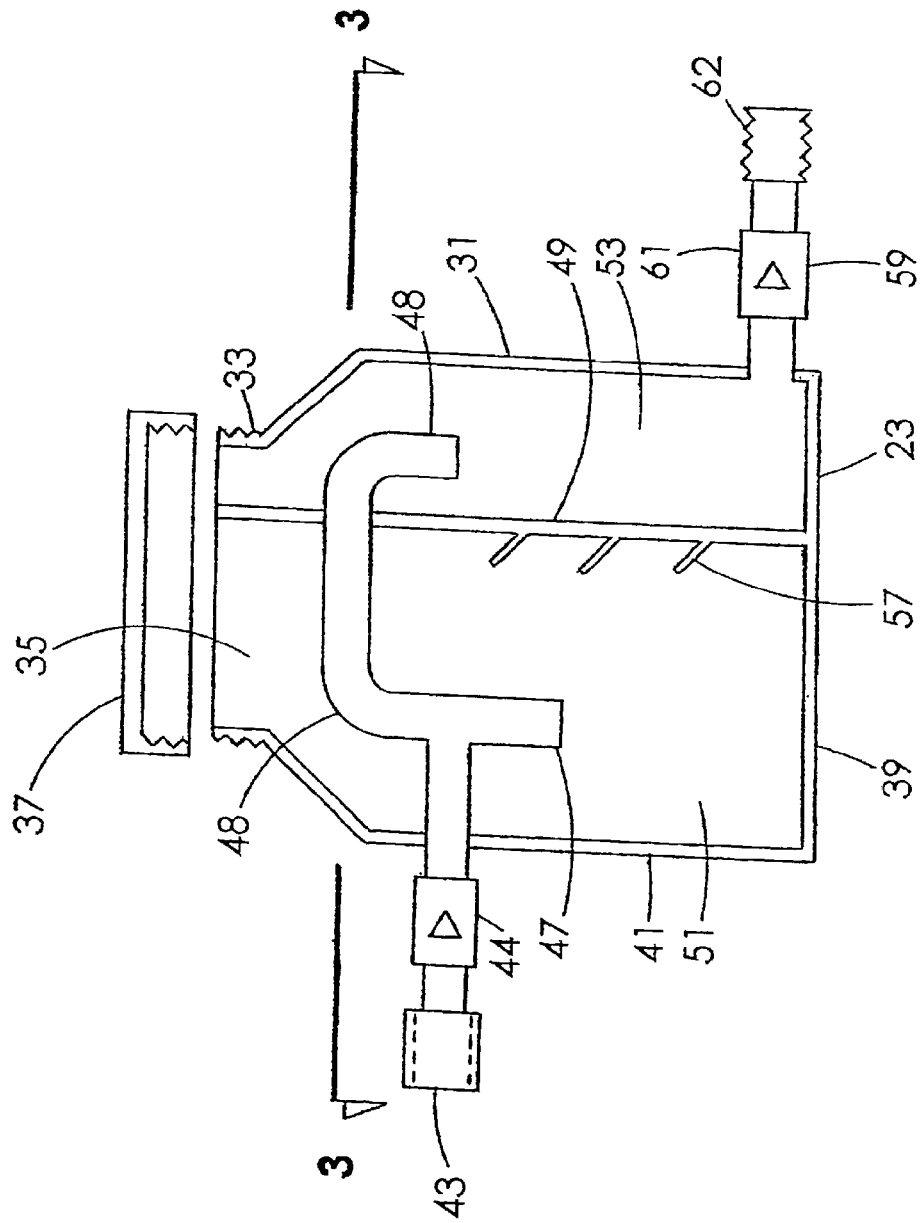
FIG. 2 is a cross sectional view of the fertilizer dispenser showing the inlet and the outlet and the baffle dividing the fertilizer vessel into two compartments.
Figure 3:
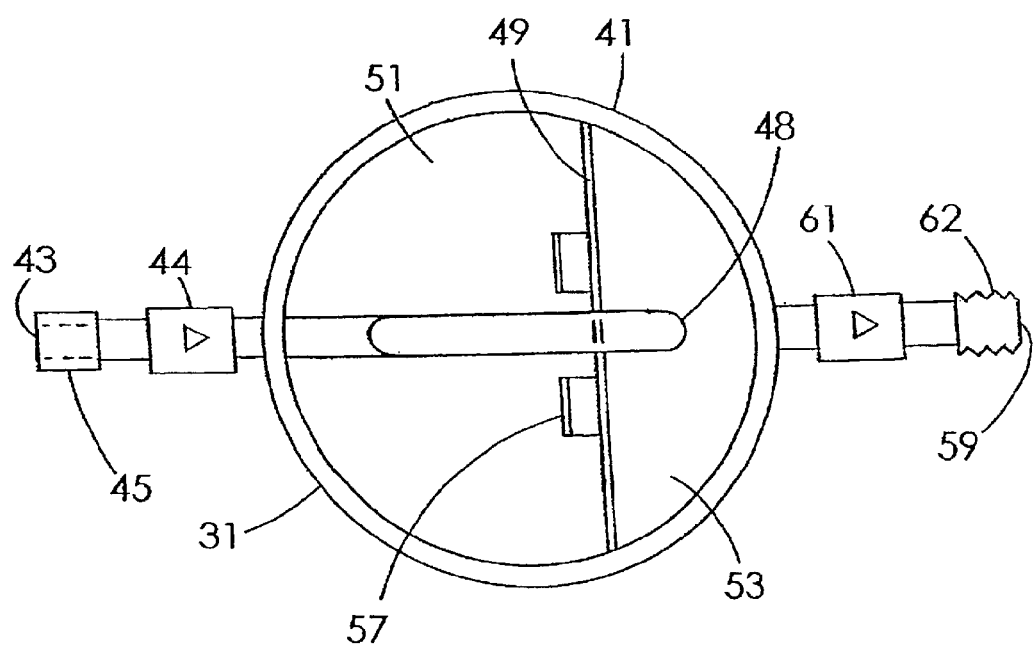
FIG. 3 is a cross sectional view of the fertilizer dispenser along line 3—3 of FIG. 2.

Referring now to FIG. 2 and FIG. 3, the fertilizer dispenser 23 is shown in detail.

The fertilizer dispenser 23 includes a fertilizer vessel 31. The fertilizer vessel 31 has a top 33 with an opening 35 to permit fertilizer to be placed into the fertilizer vessel 31. The opening 35 must be capable of being securely closed by a cover 37 which may be a screw cap. The fertilizer vessel 31 has a bottom 39 opposite from the top 33. A wall 41 surrounds the fertilizer vessel 31 between the top 33 and the bottom 39. The fertilizer vessel 31 is shown as cylindrical but other configurations would also be suitable.

An inlet 43 is provided to feed water from the water source 21 into the fertilizer vessel 31. A check valve 44 is located in the inlet 43 to prevent the backflow of fertilizer into the water source 21. The inlet 43 is provided with a female connector 45. The inlet 43 is located in the wall 41 of the fertilizer vessel 31 toward the top 33. The supply hose 25 from the water source 21 is connected to the inlet 43. The inlet 43 supplies water from the water source 21 into an inlet sub-supply line 47 and an outlet sub-supply line 48. Both of the sub-supply lines 47,48 are located within the fertilizer vessel 31. A baffle 49 is located within the fertilizer vessel 31 which divides the fertilizer vessel 31 into two compartments within the fertilizer vessel 31, namely an inlet compartment 51 adjacent the inlet 43 and an outlet compartment 53. The baffle 49 extends from the bottom 39 of the fertilizer vessel 31 to adjacent but below the top 33 of the fertilizer vessel 31. The baffle 49 may be a flat sheet or may be a curved as the curvature provides greater strength.

The inlet compartment 51 is larger than the outlet compartment 53 and the fertilizer to be applied is placed in the inlet compartment 51. The inlet sub-supply line 47 in the fertilizer vessel 31 is directed directly into the inlet compartment 51. The outlet sub-supply line 48 is directed over the baffle 49 into the outlet compartment 53. Both sub-supply lines 47, 48 are preferably substantially the same size thus providing substantially similar flows of water into both the inlet compartment 51 and the outlet compartment 53.

On the side of the baffle 49 within the inlet compartment 51, spoilers 57 are located to enhance the turbulence of the water flow in the first compartment 51 and thus increase the mixing of the water from the water source 21 with the fertilizer. The spoilers 57 are sheets secured at one edge to the baffle 49 which slope upwardly toward the top 33 of the fertilizer vessel 31.

In the wall 41 adjacent the bottom 39 of the fertilizer vessel 31 an outlet 59 is located. An outlet check valve 61 is located in the outlet 59 to prevent any back flow into the fertilizer vessel thus providing, with the inlet check valve 44 in the inlet 43, added protection against back flow of fertilizer into the water source 21. The outlet 59 has a male connector 62 to connect to a supply line 25.

The cover 37 is removed only with the water source 21 turned off and fertilizer to be applied through the soak hose 27 is placed into the first compartment 51. The cover 37 is secured to seal the fertilizer vessel 31 and the water source 21 is turned on. Water blends and mixes with the fertilizer in the inlet compartment 51 aided by the spoilers 57. The mixture of water and fertilizer flows over the baffle 49 to the outlet compartment 53 where additional water is provided by the outlet sub-supply line 48 resulting in greater dilution and mixing. The mixture of fertilizer and water then leaves the fertilizer dispenser 23 through the outlet 59 and soaks into the soil with the water.

The fertilizer vessel 31 may be removed from supply line 25 when not is use but there is no advantage in removal as fertilization ceases, in any event, when the fertilizer is exhausted.

The sequence of flow shown in FIG. 1 can be described in greater detail by specifying separately the various sections of the supply line or hose 25 and the soak hoses or lines 27. A first supply section 63 is shown connected to the water source 21. The first supply section 63 connects to the fertilizer dispenser 23 and a second supply section 65 extends from the fertilizer dispenser 23 to a first soak section 67 which is placed about a first piece of vegetation 19 shown as a tree 13. A third supply section 71 extends in series from the first soak section 67 to a second piece of vegetation 19 shown as a shrub 15. A second soak section 73 is located about the second piece of vegetation 19. A fourth supply section 75 extends in series from the second soak section 73 to a third soak section 77 about the third piece of vegetation 19, also shown as a shrub 15 surrounded by a fourth soak section 80. A fifth supply section 79 extends in series to a fourth soak section 80 about a fourth piece of vegetation 19 also shown as a shrub 15. In similar fashion a sixth supply section 81, a seventh supply section 83 and an eighth supply section 85 respectively connect in series to a fifth soak section 87, a sixth soak section 89 and a seventh soak section 91, each being located respectively about the fifth, sixth and seventh pieces of vegetation 19 being three smaller shrubs 15. Similarly, a ninth supply section 93 connects in series to an eighth soak section 95 which extends in series along two groups of vegetation 19 which are shown as two generally parallel rows of plants 17. At the end of the eighth soak section 95, the end cap 29, as previously described, is located.

Obviously, the number of supply hoses 25 can and will vary as well as the length and number of the various soak hoses 27. The length of the various soak lines will also vary. By providing a kit with soak hoses 27 of various lengths and by using commercially available hose for supply hose 25, the system can be readily installed to provide a well watered and fertilized garden without the waste of either water or fertilizer.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A system for simultaneously watering and fertilizing vegetation, said system comprising:
    a water source;
    a fertilizer dispenser including:
        a fertilizer vessel having a top and a bottom and a wall connecting the top and the bottom,
        an inlet connected to the fertilizer vessel, the inlet being located in the wall of the fertilizer adjacent the top of the fertilizer vessel, the inlet being connected to the water source,
        a baffle located in the fertilizer vessel, the baffle dividing the fertilizer vessel into two compartments, the baffle forming an inlet compartment within the fertilizer vessel adjacent the inlet and an outlet compartment within the fertilizer vessel on the opposite side of the baffle, the inlet being connected to two sub-supply lines, one of which is directed into the inlet compartment and the other of which is directed into the outlet compartment,
        an outlet connected to the fertilizer vessel and being located adjacent the bottom of the fertilizer vessel and being located in the outlet compartment,
    means for watering vegetation; and
    means for connecting the means for watering the vegetation to the outlet of the fertilizer vessel.

2. A system according to claim 1 wherein the fertilizer vessel further includes a removable cover at the top.

3. A system according to claim 1 wherein the fertilizer vessel further includes an inlet check valve located in the inlet to prevent flow back to the water source.

4. A system according to claim 1 wherein the baffle extends from the bottom of the fertilizer vessel to a point adjacent but below the top of the fertilizer vessel.

5. A system according to claim 1 wherein the baffle has spoilers extending from the baffle into the inlet compartment.

6. A system according to claim 1 wherein the fertilizer vessel further includes an inlet check valve located in the inlet top prevent flow back to the water source and an outlet check valve located in the outlet to prevent flow back into the fertilizer vessel.

7. A system for simultaneously watering and fertilizing vegetation, said system comprising:
    a water source;
    a fertilizer dispenser including:
        a fertilizer vessel having a top and a bottom and having a removable cover at the top and a wall connecting the top and the bottom,
        an inlet connected to the fertilizer vessel, the inlet being located in the wall of the fertilizer adjacent the top of the fertilizer vessel, the inlet being connected to the water source, the inlet having a female connector,
        an inlet check valve located in the inlet to prevent flow back to water source,
        a baffle located in the fertilizer vessel, the baffle dividing the fertilizer vessel into two compartments, the baffle extending from the bottom of the fertilizer vessel to a point adjacent but below the top of the fertilizer vessel, the baffle forming an inlet compartment within the fertilizer vessel adjacent the inlet and an outlet compartment within the fertilizer vessel on the opposite side of the baffle, the baffle having spoilers extending from the baffle into the inlet compartment, the inlet being connected to an inlet sub-supply line directed into the inlet compartment and to an outlet sub-supply line directed into the compartment, an outlet connected to the fertilizer vessel and being located in the wall of the fertilizer vessel adjacent the bottom of the fertilizer vessel and being located in the outlet compartment, and a second check valve located in the outlet to prevent flow back into the fertilizer vessel;

a first supply line connected to the outlet;

a first soak line connected to the first supply line;

a second supply line connected in series to the first soak line; and a second soak line connected in series to the second supply line.

8. A fertilizer dispenser for use in a fertilizer dispenser system for simultaneously watering and fertilizing vegetation, said fertilizer dispenser comprising:

a fertilizer vessel having a top and a bottom and a wall connecting the top and the bottom, an inlet connected to the fertilizer vessel, the inlet being located adjacent the top of the fertilizer vessel, a baffle located in the fertilizer vessel, the baffle dividing the fertilizer vessel into two compartments, the baffle having spoilers extending from the baffle into the inlet compartment, the baffle forming an inlet compartment within the fertilizer vessel adjacent the inlet and an outlet compartment within the fertilizer vessel on the opposite side of the baffle; and an outlet connected to the fertilizer vessel and being located adjacent the bottom of the fertilizer vessel and being located in the second compartment.

* * * * *